(12) United States Patent
Theunissen et al.

(10) Patent No.: US 10,341,124 B2
(45) Date of Patent: Jul. 2, 2019

(54) POWER DISTRIBUTION SYSTEM

(71) Applicant: SIGNIFY HOLDING B.V., Eindhoven (NL)

(72) Inventors: Bob Bernardus Anthonius Theunissen, Zaltbommel (NL); Lennart Yseboodt, Retie (BE); Henricus Theodorus Van Der Zanden, Sint-Oedenrode (NL); Matthias Wendt, Würselen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 381 days.

(21) Appl. No.: 14/914,798

(22) PCT Filed: Jul. 24, 2014

(86) PCT No.: PCT/EP2014/065874
§ 371 (c)(1),
(2) Date: Feb. 26, 2016

(87) PCT Pub. No.: WO2015/028210
PCT Pub. Date: Mar. 5, 2015

(65) Prior Publication Data
US 2016/0204949 A1 Jul. 14, 2016

(30) Foreign Application Priority Data

Aug. 27, 2013 (EP) .................................... 13181853

(51) Int. Cl.
*H04L 12/10* (2006.01)
*H05B 37/02* (2006.01)

(52) U.S. Cl.
CPC ......... *H04L 12/10* (2013.01); *H05B 37/0254* (2013.01)

(58) Field of Classification Search
CPC . H04L 12/10; H04L 25/0264; H05B 37/0254; G06F 1/26; G06F 1/266
See application file for complete search history.

(56) References Cited

U.S. PATENT DOCUMENTS 7,698,580 B2 * 4/2010 Schindler ................ G06F 1/266
323/371
7,865,754 B2 1/2011 Burkland et al.
(Continued)

FOREIGN PATENT DOCUMENTS

JP 2012108847 A 6/2012

*Primary Examiner* — Ryan Johnson
(74) *Attorney, Agent, or Firm* — Meenakshy Chakravorty

(57) ABSTRACT

The invention relates to a power distribution system comprising a power providing device (3) for providing power and a powered device (4, 5, 6) like a luminaire to be powered by the power providing device. The power providing device and the powered device are operable in a maximum power mode and a normal operation mode, wherein in the maximum power mode the powered device consumes an amount of power maximally consumable by the powered device and the power providing device measures the power consumed by the powered device. This measured power allows for an allocation of an amount of power in the operational mode, which is really maximally needed, wherein it is not necessary to allocate a larger amount of power, which is large enough to consider, for instance, a maximally assumed length of an electrical connection (8) connecting the devices, thereby improving the power budget allocation.

13 Claims, 2 Drawing Sheets

(56) References Cited

U.S. PATENT DOCUMENTS

| | | |
|---|---|---|
| 8,037,324 B2 | 10/2011 | Hussain |
| 8,171,315 B2 | 5/2012 | Karam et al. |
| 2007/0257780 A1 | 11/2007 | Schindler |
| 2008/0052546 A1 | 2/2008 | Roland et al. |
| 2010/0205466 A1 | 8/2010 | Diab et al. |
| 2012/0223650 A1 | 9/2012 | Radermacher |

* cited by examiner

POWER DISTRIBUTION SYSTEM

CROSS-REFERENCE TO PRIOR APPLICATIONS

This application is the U.S. National Phase application under 35 U.S.C. § 371 of International Application No. PCT/EP2014/065874, filed on Jul. 24, 2014, which claims the benefit of European Patent Application No. 13181853.6, filed on Aug. 27, 2013. These applications are hereby incorporated by reference herein.

FIELD OF THE INVENTION

The invention relates to a power distribution system comprising a power providing device for providing power and a powered device like a luminaire to be powered by the power providing device. The invention further relates to the power providing device, the powered device, and a power distribution method and computer program for distributing power within the power distribution system.

BACKGROUND OF THE INVENTION

According to the Power over Ethernet (PoE) IEEE Standard 802.3at a powered device (PD) is powered by power sourcing equipment (PSE) via an Ethernet cable. The PD is assigned to a power class and is adapted to indicate its power class to the PSE, wherein the PSE uses a lookup table for providing a predefined amount of power depending on the indicated power class of the PD. The predetermined amount of power provided by the PSE has to be relatively large, in order to ensure that the PD receives the amount of power, which is needed by the PD, even if the Ethernet cable has a maximally assumed cable length and thus maximally assumed cable losses are present. Since the length of the Ethernet cable between the PSE and the PD will generally be smaller than the maximally assumed cable length, the PSE generally provides unnecessarily an amount of power being larger than the amount of power required by the PD. Thus, the power budget allocation is not very good.

SUMMARY OF THE INVENTION

It is an object of the present invention to provide a power distribution system comprising a power providing device for providing power and a powered device to be powered by the power providing device, which allows for an improved power budget allocation. It is a further object of the present invention to provide the power providing device, the powered device, and a power distribution method and computer program for distributing the power within the power distribution system, which allow for an improved power budget allocation.

In a first aspect of the present invention a power distribution system is presented, wherein the power distribution system comprises:

a power providing device for providing power, a powered device to be powered by the power providing device, an electrical conductor for transferring the power from the power providing device to the powered device, wherein the power providing device and the powered device are adapted to be operable in at least a maximum power mode and a normal operation mode, wherein the powered device is adapted to consume an amount of power maximally consumable by the powered device in the maximum power mode and wherein the power providing device is adapted to measure in the maximum power mode the amount of power consumed by the powered device.

After the amount of power consumed by the powered device in the maximum power mode has been measured, the power providing device knows the maximal amount of power needed in the normal operation mode, wherein actual transferring losses due to the transfer of the power along the electrical conductor and potential further losses in used electronics are automatically considered. This allows the power providing device to allocate for the powered device an amount of power in the operational mode, which is really maximally needed for powering the powered device, wherein it is not necessary to allocate for the powered device in the normal operation mode a larger amount of power, which is large enough to consider, for instance, a maximally assumed length of the electrical conductor between the power providing device and the powered device, thereby improving the power budget allocation. The amount of power measured in the maximum power mode also allows for an improved over power protection. In particular, the power providing device can be adapted to switch off the provision of power to the powered device in the normal operation mode, if the power providing device detects in the normal operation mode that the powered device tries to consume an amount of power being larger than the amount of power measured in the maximum power mode.

The power providing device can be regarded as being PSE, which is connected to one or several powered devices, which may be luminaires with light sources and possibly additional electrical elements like sensors. For providing the power from the power providing device to the one or several powered devices preferentially Ethernet cables are used. The power providing device and the powered device are therefore preferentially PoE devices. The power providing device may comprise a power conversion unit for converting power from a main power source or another power source to the power actually provided to the one or several powered devices.

The power providing device is preferentially adapted to reserve for the powered device in the normal operation mode an operational amount of power, which depends on the amount of power measured in the maximum power mode, in order to allow the powered device to consume in the normal operation mode an amount of power being equal to or lower than the operational amount of power. Preferentially, the reserved operational amount of power is equal to the amount of power measured in the maximum power mode. However, the reserved operational amount of power can also be larger, for instance, a predetermined percentage value larger, than the amount of power measured in the maximum power mode, in order to consider, for instance, possible measurement inaccuracies. In particular, the powered device may be assigned to one of at least one first power class and at least one second power class, wherein the powered device is adapted to indicate its power class to the power providing device, wherein to each power class of the first and second power classes a predetermined power is assigned, wherein the power providing device may be adapted a) to, if the power class of the powered device is a first power class, switch to the maximum power mode, in which the predetermined amount of power assigned to the power class of the powered device is provided and the amount of power consumed by the powered device is measured, and thereafter switch to the normal operation mode, in which the operational amount of power, which depends on the amount of power measured in the maximum power mode, is reserved for the powered device, in order to allow the powered device to consume in the normal operation mode an amount of power being equal to or lower than the operational amount of power, and b) to, if the power class of the powered device is a second power class, switch to the normal operation mode, wherein in this case in the normal operation mode the predetermined amount of power assigned to the power class of the powered device is reserved for the powered device, in order to allow the powered device to consume in the normal operation mode an amount of power being equal to or lower than the predetermined amount of power assigned to the power class of the powered device. This allows the power providing device to be used for providing power a) to powered devices assigned to a first power class, i.e. to powered devices being operable in a maximum power mode which allows the power providing device to measure the power maximally consumable by the powered device, and b) to powered devices assigned to a second power class, i.e. which are not operable in a maximum power mode in which they consume a power maximally consumable by the respective powered device, wherein in the latter case a maximally expected power is reserved for to the powered device, which is preferentially similar to the reservation of the power to a powered device as defined in the IEEE standard 802.3at and/or the IEEE standard 802.3af. The at least one first power class may be regarded as being an additional power class for the respective IEEE standard.

The at least one first power class can be regarded as being a self-learning class or auto-power class, wherein, if the power class of the powered device is a first power class, the maximally required amount of power is self-learned by the power providing device. For instance, after in a classification phase the powered device has indicated its power class to the power providing device such that the power providing device can detect the power class, in the maximum power phase the power providing device can grant the highest amount of power for the powered device being the power assigned to the power class of the powered device, i.e. grant the predetermined power. After the power has been granted, in the maximum power phase the powered device can consume the maximum amount of power it can encounter in normal operation. For a luminaire that can mean to go to 100 percent dim level, activate all sensors, if any, and disable all power down modes. Since the power providing device has detected the auto-power class, it will perform one or more measurements of the power currently consumed. Preferentially after a predetermined amount of time, the power providing device knows the required maximum power budget of the powered device and can release the remainder of the budget originally allocated.

The power providing device can be adapted to switch off the provision of power to the powered device in the normal operation mode, if the power providing device detects in the normal operation mode that the powered device consumes an amount of power being larger than the operational amount of power. The power providing device is preferentially adapted to measure the average or peak amount of power consumed by the powered device over a predetermined time in the maximum power mode and to reserve in the normal operation mode for the powered device an operational amount of power, which depends on the measured average or peak amount of power, in order to allow the powered device to consume in the normal operation mode an amount of power being equal to or lower than the operational amount of power. Preferentially, the reserved operational amount of power is equal to the amount of power measured in the maximum power mode, i.e. equal to the measured average or peak amount of power in this example. However, the reserved operational amount of power can also be larger, for instance, a predetermined percentage value larger, than the amount of power measured in the maximum power mode, i.e. than the measured average or peak amount of power in this example, in order to consider, for instance, possible measurement inaccuracies.

Preferentially, the power providing device is adapted to allocate in the maximum power mode a predetermined amount of power to the powered device, which is equal to or larger than an amount of power that is assumed to be maximally measured in the maximum power mode, when the powered device maximizes its power consumption. This predetermined power preferentially considers maximally assumed losses, which may be caused by a maximally assumed length of the electrical conductor electrically connecting the power providing device and the powered device. Preferentially, the powered device is assigned to a power class and adapted to indicate its power class to the power providing device, wherein the power providing device is adapted such that the predetermined amount of power in the maximum power mode depends on the power class of the powered device. Allocating the amount of power in the maximum power mode depending on the power class of the powered device allows ensuring that the powered device receives an amount of power in the maximum power mode, which is larger than the amount of power maximally consumable by the powered device of the respective power class, taking into account maximally assumed losses like cable losses. This allows reliably determining the amount of power maximally consumable by the powered device, taking into account the actual real losses which are generally smaller than the maximally assumed losses, while the power providing device and the powered device are in the maximum power mode. If the power providing device unexpectedly detects in the maximum power mode that the powered device tries to consume an amount of power being larger than the predetermined amount of power, preferentially the power providing device switches the provision of the power to the powered device off.

The power providing device and the powered device can be adapted such that they are switched into the maximum power mode, after a classification phase, in which the powered device has indicated its power class to the power providing device, has been completed. The power providing device and the powered device may be further adapted to switch from the maximum power mode to the normal operation mode after a predetermined time, during which the power maximally consumable by the powered device is measured by the power providing device.

The powered device can be adapted to indicate its power class to the power providing device by drawing an indication current from the power providing device, wherein the power providing device can be adapted to detect the power class by measuring the drawn current. For instance, the power providing device can detect the power class by measuring the drawn current, which may be drawn during a classification phase, i.e. in which the powered device and the power providing device are in a classification mode, and by comparing the measurement with a lookup table, in which assignments between drawn currents and power classes are stored. This allows indicating the power class of the powered device to the power providing device without requiring Ethernet functionality like a communication protocol structure. The power providing device and/or the powered device may therefore be technically simpler.

In another aspect of the present invention a power providing device to be used in a power distribution system as defined in claim 1 is presented, wherein the power providing device is adapted to provide power to the powered device of the power distribution system in at least a maximum power mode and a normal operation mode, wherein the power providing device is adapted to measure in the maximum power mode the amount of power consumed by the powered device.

In a further aspect of the present invention a powered device to be used in a power distribution system as defined in claim 1 is presented, wherein the powered device is adapted to be powered by the power providing device of the power distribution system in at least a maximum power mode and a normal operation mode, wherein the powered device is adapted to consume an amount of power from the power providing device, which is maximally consumable by the powered device, in the maximum power mode.

In another aspect of the present invention a power distribution method for distributing power within the power distribution system as defined in claim 1 is presented, wherein the power distribution method comprises:

consuming an amount of power from the power providing device by the powered device, which is maximally consumable by the powered device, in a maximum power mode, measuring the consumed power by the power providing device in the maximum power mode.

In a further aspect of the present invention a computer program for distributing power within the power distribution system as defined in claim 1 is presented, wherein the computer program comprises program code means for causing the power distribution system to carry out the steps of the power distribution method as defined in claim 14, when the computer program is run on a computer controlling the power distribution system.

It shall be understood that the power distribution system of claim 1, the power providing device of claim 12, the powered device of claim 13, the power distribution method of claim 14, and the computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
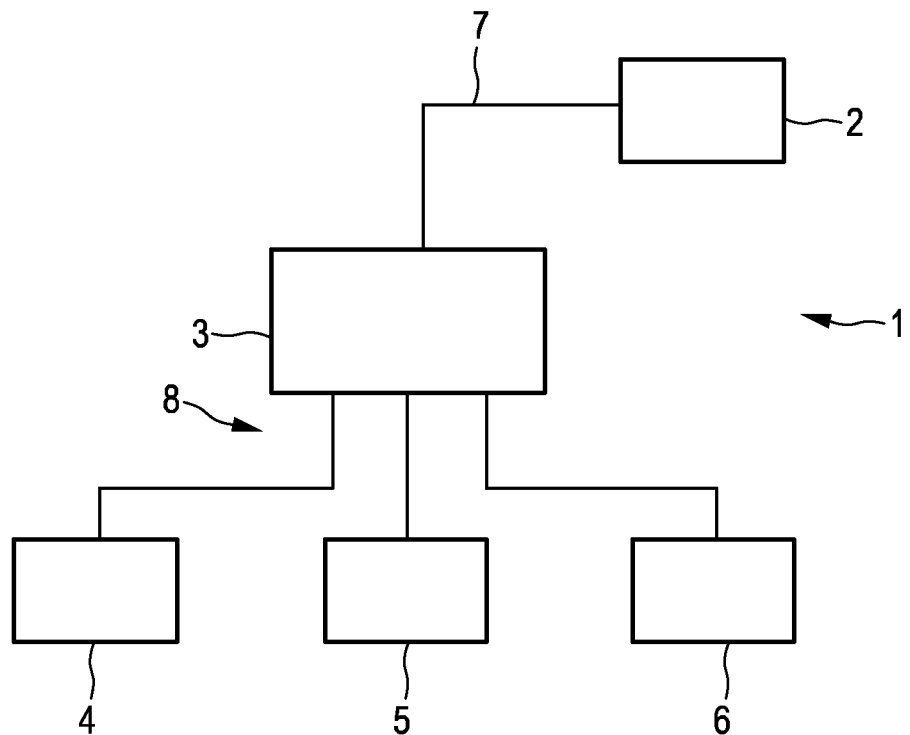
FIG. 1 shows schematically and exemplarily a power distribution system.

FIG. 1 shows schematically and exemplarily an embodiment of a power distribution system 1 comprising a power providing device 3 for providing power and powered devices 4, 5, 6 to be powered by the power providing device 3. In this embodiment the power providing device 3 comprises a power supply unit being a power conversion unit for converting power received from a mains power device 2 via a cable 7 to the power to be provided to the powered devices 4, 5, 6. The power providing device 3 may also be regarded as being a PSE.

In this embodiment the powered devices 4, 5, 6 are luminaires, which are connected to the power providing device 3 via Ethernet cables 8. The power providing device 3 and the powered devices 4, 5, 6 are adapted to be operable in at least a maximum power mode and a normal operation mode, wherein each powered device 4, 5, 6 is adapted to consume an amount of power maximally consumable by the respective powered device 4, 5, 6 in the maximum power mode and wherein the power providing device 3 is adapted to measure in the maximum power mode the respective amount of power consumed by the respective powered device 4, 5, 6 and to reserve for the respective powered device 4, 5, 6 in the normal operation mode a respective operational amount of power, which depends on the respective amount of power measured in the maximum power mode, in order to allow the respective powered device 4, 5, 6 to consume in the normal operation mode an amount of power being equal to or lower than the respective operational amount of power. Thus, for each powered device 4, 5, 6 an individual maximal amount of power is measured in the maximum power mode, wherein in the normal operation mode for each powered device 4, 5, 6 the respective operational amount of power can be reserved, i.e. allocated, depending on the respective maximal amount of power measured in the maximum power mode. In this embodiment the respective reserved operational amount of power is equal to the respective maximal amount of power measured in the maximum power mode. However, in another embodiment the respective reserved operational amount of power can also be larger, for instance, a predetermined percentage value larger, than the respective amount of power measured in the maximum power mode, in order to consider, for instance, possible measurement inaccuracies.

The power providing device 3 can be adapted to provide a constant voltage, wherein in this case the power consumed by the respective powered device 4, 5, 6 is measured by measuring the current. However, the power providing device 3 may also be adapted to provide a constant current, wherein in this case the power is measured by measuring the voltage.

The power providing device 3 can be further adapted to switch off the provision of power to the respective powered device 4, 5, 6 in the normal operation mode, if the power providing device 3 detects in the normal operation mode that the respective powered device 4, 5, 6 tries to consume an amount of power being larger than the amount of power measured in the maximum power mode. For instance, if the power providing device 3 is adapted to provide a constant voltage, the power providing device 3 can measure the respective current drawn by the respective powered device 4, 5, 6 in the normal operation mode, in order to measure the amount of power consumed in the normal operation mode, wherein, if this measured amount of power is larger than the amount of power measured in the maximum power mode, the power providing device 3 can switch off the respective powered device 4, 5, 6. An over power protection can therefore be performed in an over current protection mechanism.

Before measuring the maximally consumable power in a maximum power phase, in which the power providing device 3 and the powered devices 4, 5, 6 are in the maximum power mode, in a classification phase the powered devices 4, 5, 6 indicate their individual power classes to the power providing device 3. In this embodiment each powered device 4, 5, 6 is adapted to indicate its power class to the power providing device 3 by drawing an indication current from the power providing the device 3, wherein the power providing device 3 is adapted to detect the power class by measuring the respective drawn current. For instance, the power providing device 3 can detect the power class by measuring the respective drawn current and by comparing the measurement with a lookup table, in which assignments between drawn currents and power classes are stored. The respective powered device draws the indication current from the power providing device 3 by connecting a respective classification resistance to the terminals, to which the power providing device 3 is connected.

The power providing device 3 is adapted to allocate in the maximum power mode to the respective powered device 4, 5, 6 a respective predetermined amount of power depending on the power class of the respective powered device 4, 5, 6. The predetermined amount of power is preferentially equal to or larger than an amount of power that is assumed to be maximally measured in the maximum power mode, when the respective powered device 4, 5, 6 maximizes its power consumption. The power providing device 3 can use a lookup table for determining the predetermined amount of power to be allocated to the respective powered device 4, 5, 6 depending on the respective power class. In particular, the power providing device 3 can use a first lookup table for determining the respective power class depending on the respective drawn current and a second lookup table for determining the predetermined amount of power to be allocated to the respective powered device 4, 5, 6 in the maximum power mode depending on the respective power class. However, the power providing device 3 can also comprise a single lookup table with assignments between drawn currents and predetermined amounts of power to be allocated to the respective powered device 4, 5, 6 in the maximum power mode, wherein this lookup table can be used to directly determine the respective predetermined amount of power to be provided in the maximum power mode.

The power providing device 3 can be adapted to determine whether the power class of the respective powered device 4, 5, 6 belongs to a first group of power classes, i.e. is a first power class, or belongs to a second group of power classes, i.e. is a second power class. The first power class indicates powered devices, which are operable in the maximum power mode such that the maximally consumable amount of power can be measured by the power providing device 3. The second power class indicates powered devices, which are not operable in the maximum power mode and to which therefore a maximally expected amount of power needs to be provided, wherein this maximally expected amount of power can be determined from a lookup table and from the respective second power class. Thus, the power providing device 3 can be adapted a) to switch to the maximum power mode for the respective powered device 4, 5, 6, in which the predetermined amount of power assigned to the power class of the respective powered device 4, 5, 6 is provided and the amount of power consumed by the respective powered device 4, 5, 6 is measured, and thereafter switch to the normal operation mode, in which the respective operational amount of power, which depends on the respective amount of power measured in the maximum power mode, is reserved for the respective powered device 4, 5, 6, in order to allow the respective powered device 4, 5, 6 to consume in the normal operation mode an amount of power being equal to or lower than the respective operational amount of power, and b) to switch directly to the normal operation mode for the respective powered device, if the power class of the respective powered device is a second power class, wherein in this case in the normal operation mode the predetermined amount of power assigned to the power class of the respective powered device can be reserved for the respective powered device, in order to allow the respective powered device to consume in the normal operation mode an amount of power being equal to or lower than the respective predetermined amount of power assigned to the power class of the respective powered device. In this embodiment the powered devices 4, 5, 6 are assigned to first power classes. However, additional powered devices of the first power class and also of the second power class may be connected to the power providing device 3.

The first power classes can be regarded as being self-learning classes or auto-power classes, because in the first power classes the amount of power to be reserved in normal operation is automatically determined during the maximum power phase, in which the power providing device 3 and the respective powered device 4, 5, 6 are in the maximum power mode.

The power providing device 3 is preferentially adapted to measure the average or peak amount of power consumed by the respective powered device 4, 5, 6 over a predetermined time period in the maximum power mode and to reserve in the normal operation mode for the respective powered device 4, 5, 6 the respective operational amount of power depending on the respective measured average or peak amount of power, in order to allow the respective powered device 4, 5, 6 to consume in the normal operation mode a respective amount of power being equal to or lower than the respective operational amount of power, wherein in this example the respective operational amount of power is preferentially equal to the respective average or peak amount of power measured in the maximum power mode. Thus, after this predetermined time period the power providing device 3 and the respective powered device 4, 5, 6 may switch to the normal operation mode, in which the respective measured average or peak amount of power is reserved.

Figure 2:
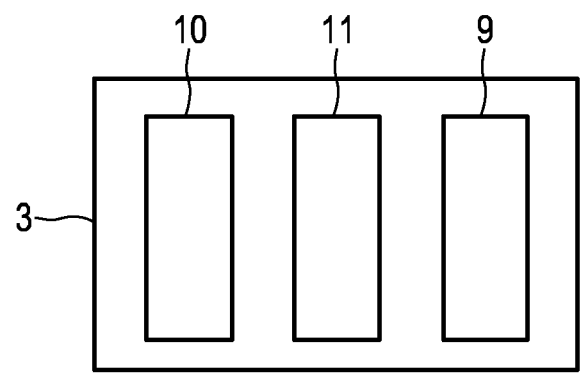
FIG. 2 shows schematically and exemplarily a power providing device of the power distribution system.

FIG. 2 shows schematically and exemplarily the power providing device 3 in more detail. The power providing device 3 comprises a power conversion unit 9 for converting the power received from the mains power device 2 to the individual powers to be provided to the powered devices 4, 5, 6. The power providing device 3 further comprises a measuring unit 10 for measuring the current drawn by the respective powered device 4, 5, 6 during the classification phase, in which the power class of the respective powered device 4, 5, 6 is determined, and for measuring the power consumed by the respective powered device 4, 5, 6 during the maximum power phase, in which the power providing device 3 and the respective powered device 4, 5, 6 are in the maximum power mode. The power providing device 3 further comprises a controller 11 like a microcontroller for controlling the measuring unit 10 and the power conversion unit 9 in accordance with the different phases and modes of operation. The power providing device 3 can comprise further components like an Ethernet communication component which are not shown in FIG. 2 for clarity reasons.

Figure 3:
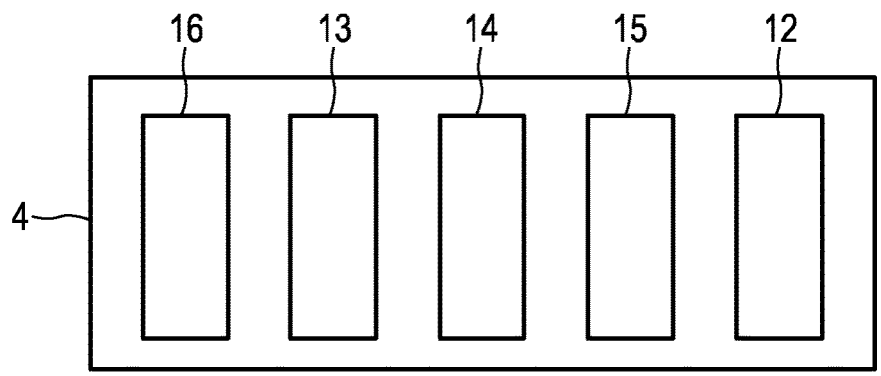
FIG. 3 shows schematically and exemplarily a powered device of the power distribution system.

FIG. 3 shows schematically and exemplarily an embodiment of a powered device 4. In this example the other powered devices 5, 6 are similar to the powered device 4 schematically shown in FIG. 3. The powered device 4 is a luminaire comprising a lamp 12 with an integrated driver and a sensor 13 also with an integrated driver. The lamp 12 comprises preferentially light-emitting diodes (LEDs). The sensor 13 is a presence sensor for detecting the presence of a person close to the luminaire 4. Alternatively or in addition, the luminaire 4 may comprise another sensor like a temperature sensor, a light sensor, et cetera. The powered device 4 further comprises a classification unit 14 for drawing the classification current, in order to indicate to the power providing device 3 the power class of the powered device 4, a measuring unit 16 for measuring electrical parameters like voltages applied to the powered device 4 by the power providing device 3 and a controller 15 like a microcontroller for controlling the lamp 12, the sensor 13, the classification unit 14 and the measuring unit 16 in accordance with the different phases and modes of operation. The controller 15 can also be adapted to control the lamp 12 depending on a sensing signal received from the sensor 13. The classification unit 14 can comprise a resistor to be connected to terminals of the powered device 4 during a classification phase, in order to allow the power providing device 3 to determine the power class of the powered device 4. The classification unit 14 can further be adapted to connect a detection resistance to the terminals of the powered device 4 in a detection phase, which may be performed before the classification phase, in order to indicate to the power providing device 3 that a valid PoE powered device has been connected to the power providing device 3 via an Ethernet cable 8. Also the powered device 4 can comprise further components like an Ethernet communication component, which are not shown in FIG. 3 for clarity reasons.

Figure 4:
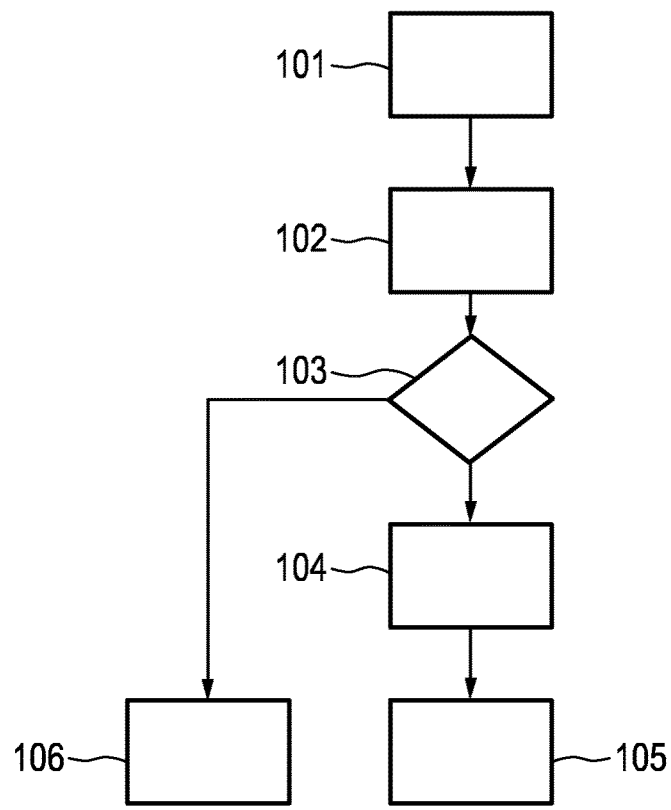
FIG. 4 shows a flowchart exemplarily illustrating an embodiment of a power distribution method for distributing power within the power distribution system.

In the following an embodiment of a power distribution method for distributing power within the power distribution system 1 will exemplarily be described with reference to a flowchart shown in FIG. 4.

In step 101 the controller 11 controls power providing unit 3 such that a detection voltage is periodically applied to the ports of the power providing device 3. If in this detection phase the powered device 4 is electrically connected to the ports of the power providing device 3 via an Ethernet cable 8, the detection voltage is measured by the measuring unit 16 of the powered device 4, wherein due to this measurement of the detection voltage the controller 15 knows that the classification unit 14 should connect the detection resistor to the terminals of the powered device 4. This connection of the detection resistor to the terminals of the powered device 4 can be detected by the power providing device 3 by measuring the drawn current by using the measuring unit 10. In this way the power providing device 3 can detect that the powered device 4 is a valid PoE powered device connected to the respective port of the power providing device 3.

After this detection phase, in step 102 the power providing device 3 applies a classification voltage to the respective port, to which the powered device 4 is connected, wherein this classification voltage can be measured by the powered device 4, in order to indicate to the powered device 4 that the classification resistance should be connected to the terminals of the powered device 4. The resulting current can be measured by the power providing device 3, wherein the power providing device 3 can determine the power class of the powered device 4 depending on the measured current.

In step 103 it is determined whether the power class determined in step 102 is a first power class or a second power class. If the determined power class is a first power class, the method continues with step 104, whereas, if the power class determined in step 102 is a second power class, the method continues with step 106. In this example the power class of the powered device 4 is a first power class such that the method continues with step 104.

In step 104, after the classification phase, in a maximum power phase the power providing device 3 allocates a predetermined amount of power to the powered device 4, which is stored in a lookup table, depending on the power class of the powered device 4 identified in step 102. In this embodiment in the lookup table the predetermined amount of power is stored by storing a corresponding predetermined voltage to be applied to the powered device 4 in the maximum power mode, wherein this predetermined voltage defines together with a predetermined maximal current, which the powered device 4 is allowed to source, the predetermined amount of power. This predetermined amount of power stored in the lookup table is predetermined such that it is surely larger than the amount of power maximally consumable by the powered device 4 having the identified power class, even if a predetermined maximally expected length of the respective Ethernet cable 8 is considered. The powered device 4 detects the applied predetermined voltage and starts to consume as much power as possible. For instance, the controller 15 controls the sensor 16 and the lamp 12 such that they consume maximum power. The powered device 4 consumes this maximum power for a predetermined time period, while the power providing device 3 measures the consumed power.

In step 105 in the normal operation phase, in which the power providing device 3 and the powered device 4 are in the normal operation mode, which is entered after the predetermined time period, during which the maximal power is consumed, has elapsed, the power providing device 3 reserves an operational amount of power, which depends on the amount of power measured in the maximum power phase in step 104, in order to allow the powered device 4 to consume in the normal operation mode an amount of power being equal to or lower than the operational amount of power. In this embodiment the operational power is equal to the measured peak amount of power or the measured average amount of power measured in the maximum power phase in step 104.

If in another example the powered device comprises a second power class, this will be determined in step 102 and in step 103 it will be decided that the method continues with step 106. In step 106 the powered device of the second class and the power providing device are in a normal operation mode, wherein in this case in the normal operation mode the predetermined amount of power assigned to the power class of the powered device, which may be stored in a lookup table, is reserved for the powered device, in order to allow the powered device to consume in the normal operation mode an amount of power being equal to or lower than the predetermined amount of power assigned to the power class of the power device.

Using PoE for lighting applications can lead to significant installation cost reductions. This is not just due to the cables, which may be CAT5/6 Ethernet cables and which are cheaper (less isolation and copper), but also due to the fact that these cables can be deployed much faster than classic mains wiring. There is also no possibility to make a wrong connection (fits only one way) and there is a clear indication of a completed connection because it locks into place with an audible click. Because the system can be installed live it is possible to detect cable errors immediately (the luminaire will remain off or blink). Live installation leads to fewer errors in the installation. Commissioning or configuration of the system can happen almost concurrently to the physical installation.

The power providing device may be a PoE Ethernet switch. However, the costs can be further reduced, if the power providing device does not comprise Ethernet functionality or provides a reduced Ethernet functionality only, which provides only Ethernet functions required by the lighting installation, but which is not overprovisioned in terms of data throughput. If devices are used that make use of PoE, but forgo the Ethernet link, enabling/disabling PoE on certain ports of the power providing device may be used to have a rudimentary control over luminaires.

Every luminaire can have an IP address, i.e. the controllers of the luminaires can be capable to run an IP stack and handle multiple protocols. The major difference to any other control system is that IP allows protocols to co-exist, guaranteeing that new capabilities can always be added. Next to that, by being directly connected to other IP devices, it allows the luminaires and other devices like separate sensors, user interfaces, et cetera to communicate with other sensors and actuators in a building. One example is the elevator notifying which floor it is going to, allowing the luminaires to complete a slow power ramp-up (for increased life time) before the people arrive on the floor in the morning. Many such examples can be thought of that do not warrant special controls just for that use-case, but become possible simply by everything being able to share information or intelligence.

The PoE Ethernet power-up operation in accordance with the PoE IEEE standard 802.3at or 802.3af has four phases. The first phase is detection. Here the PSE will check if the other end of the cable is capable and willing of receiving power. The PoE IEEE standards are designed to prevent voltage being applied on a cable when it could generate an unwanted or dangerous situation: open ended cables, or voltage applied to devices not capable of handling it. It will also quickly detect a cable being disconnected to remove the voltage on it, if it was previously powered. The second phase is classification. Here the PD can indicate to the PSE how much power it needs. The PSE is ultimately in charge to decide if power is granted or not. In the third phase it will first act as a current source to allow the capacitors at the PD side to be charged in a controlled fashion. This is to prevent overcurrent or voltage overshoot. The final phase is normal operation, where the full PoE voltage is applied to the cable and the PD can make use of the allocated power. The PSE continuously guards against either a cable disconnect or too much power consumed.

A PD in accordance with the PoE IEEE standard 802.3at or 802.3af mainly comprises an isolation switch and circuitry, i.e. a controller, to activate either a 25 kW detection resistor, or a class resistor, which is usually extern to the PD integrated circuit. The PD will activate the correct resistor depending on the voltage it senses at the input. Precise voltage ranges have been defined in the PoE IEEE standards 802.3af and 802.3at. A PSE in accordance with the PoE IEEE standard 802.3at or 802.3af comprises a more complex circuit, which will run through the detection-classification-operation state machine and has to be able to measure current going in the respective port, as well as inject various voltages/currents for the detection and classification steps.

During a typical power-up operation of a type 2 PSE, i.e. of a PSE being a PoE IEEE standard 802.3at capable device, the PSE will communicate by forcing a voltage on the respective port and the PD can 'respond' by drawing a certain amount of current that the PSE can measure. A typical sequence starts with the insertion of the cable. Every so often the PSE will force a small voltage on the respective port in the detection range in the first phase, i.e. the detection phase. An empty socket will have a high impedance, a non-PoE Ethernet device will have a low impedance of, for instance, about 150Ω. A PoE PD will present precise 25 kΩ in the detection voltage range, indicating that it is a PoE capable device. The PSE will usually perform multiple tests in the detection range to verify that it is indeed a PoE capable station in the detection phase. In the second phase, i.e. in the classification phase, the power class of the PD is determined by using a two event classification in accordance with the PoE IEEE standard 802.3at, wherein classification range voltages are injected and class currents drawn by the PD are measured. The classification can also be augmented by using LLDP (Link Layer Discovery Protocol). It is a link layer protocol that can run over Ethernet. LLDP is a layer 3 protocol, like IP, designed to be encapsulated in an Ethernet frame directly. The PD and PSE can use it to perform much more precise power management and power budgeting. Finally, after learning the required amount of power requested by the PD, the PSE can either grant or deny this power. This decision is almost always done by a microcontroller that keeps track of how much power is allocated. More details of the PD and the PSE and their operations in accordance with the PoE IEEE standards 802.3at and 802.3af are disclosed in the corresponding descriptions of these standards, which are herewith incorporated by reference.

The power distribution system described above with reference to FIGS. 1 to 3 is preferentially adapted to solve a shortcoming in the way power is negotiated in the described PoE IEEE standards 802.3af and 802.3at, which is particularly troublesome for lighting applications, by introducing a further power class, i.e. the above mentioned first power class, which can also be regarded as being an auto-power class.

Two ways exist to negotiate the required power for a PD in the PoE IEEE 802.3af and 802.3at standards. In the first PoE IEEE standard 802.3af several power classes are defined as shown in the following table, wherein it should be noted that Class 4 is defined for Type 2 PDs, i.e. for PDs compliant with the follow-up PoE IEEE standard 802.3at.

|  | Classification current | Maximum Power |
| --- | --- | --- |
| Class 0 | 0-4 mA | 0.44-12.95 W |
| Class 1 | 9-12 mA | 0.44-3.84 W |
| Class 2 | 17-20 mA | 3.84-6.49 W |
| Class 3 | 26-30 mA | 6.49-12.95 W |
| Class 4 | 36-44 mA | 12.95-25.5 W |

During the standardization process of the follow-up standard PoE IEEE standard 802.3at, people realized that it was impractical to perform precise power budgeting in this analog way. It was simply not possible to accurately detect a large amount of power classes. Hence, for the PoE IEEE standard 802.3at only a single power class was defined (12.95 W to 25.5 W) and more precise power negotiations were to be conducted over LLDP. The PoE IEEE standard 802.3at made it mandatory for PDs to support LLDP and optional for PSEs to support the two event classification.

Especially for lighting applications it is advantageous to be able to get a tight match between the required power and the power budget calculation. Without this, system designers would have to overprovision the power supply significantly to cover all the corner cases of how a system could be deployed. This is very challenging when using power classes as only very rough indications to required power can be allocated. Even if in a successor standard for the PoE IEEE standard 802.3at two power classes will be defined, covering a huge range between 25.5 W and 50 W or even 70 W, this situation will not improve. In practice this would mean that luminaires must claim a too large amount of power, resulting in severely overprovisioned power supplies. The following table illustrates how much overprovisioning results from using 20 W loads with several port counts:

|          | Required |         | Reserved |         | Over       |
|----------|----------|---------|----------|---------|------------|
|          | PD       | PSE     | PD       | PSE     | provision  |
| 1 port   | 20 W     | 20.2 W  | 25.5 W   | 33.6 W  | 14.9 W     |
| 12 ports | 240 W    | 242.4 W | 306.0 W  | 403.2 W | 178.7 W    |
| 24 ports | 480 W    | 487.2 W | 612.0 W  | 806.4 W | 354.7 W    |
| 48 ports | 960 W    | 979.2 W | 1224.0 W | 1612.8 W| 704.0 W    |

In the example illustrated by the table it is assumed that the efficiency of main power supply is 90 percent, the voltage $V_{PSE}$ provided by the PSE is 56 V and cable losses are 1 percent for the 1 port situation and the 12 ports situation, in which 1 and 12 luminaires, respectively, are connected to the PSE, 1.5 percent for the 24 ports situation, in which 24 luminaires are connected to the PSE, and 2 percent for the 48 ports situation, in which 48 luminaires are connected to the PSE. The column "Required:PD" shows the amount of power actually needed by the PDs, the column "Required:PSE" shows the power effectively drawn from the PSE, when cable losses are taken into account, the column "Reserved:PD" shows how the PSE interprets the PD power requirement because it can only indicate that it is a class 4 device, i.e. 25.5 W are allocated per port, and the column "Reserved:PSE" shows the amount of power the PSE must reserve from the main power budget, when the worst possible cable situation is taken into account. The final column shows how many watts of power must be available above what is actually needed. As can be seen, almost 50 percent extra, unused capacity must be available from the power supply if the rules of the PoE IEEE standard 802.3at are followed.

If the power is allocated depending on LLDP negotiations, LLDP-MED may be used in the PoE IEEE standard 802.3at. LLDP-MED is a link layer protocol that can be used to manage properties of a PoE link. One of the capabilities it provides is that it can negotiate power to the milliwatt level, which provides a solution to the problems associated with the rough power classes mentioned in the previous paragraph. However, a drawback of the LLDP negotiations is that the PSE must still assume worst case cables: if a PD claims 20 W as negotiated by using LLDP, the PSE must still reserve

20 W/25.5 W·0.6 A·56V=26.3 W.

This is still leading to large amounts of overprovisioning.

The power distribution system described above with reference to FIGS. 1 to 3 provides therefore at least one additional class, i.e. at least one first class, which has a self-learning behavior and which may be regarded as being an auto-power class. Further classes, i.e. the second power classes, can be, for example, the classes defined in the PoE IEEE standard 802.3af and/or the class defined in the PoE IEEE standard 802.3at.

If the power providing device detects the additional auto-power class in the classification phase, it may initially, i.e. in the maximum power phase, grant the highest amount of power for the respective PD type, i.e., for example, 12.95 W for type 1 and 25.5 W for type 2. After power has been granted, the respective powered device initially consumes the maximum amount of power it can encounter in normal operation. For a luminaire that can mean to go to 100 percent dim level, activate all sensors, if any, and disable all power down modes. Since the powered device has detected the auto-power class, it performs one or more measurements of the power currently consumed by the respective powered device. Thus, the respective powered device actually maximizes power consumption during the period, where the power providing device is performing the measurement. After a predetermined amount of time, the power providing device now knows the required maximum power budget of the respective powered device and can release the remainder of the budget originally allocated. An advantage of this kind of using the auto-power class is that the measurement of the maximal power performed by the power providing device includes the actual cable losses. This means that the power budgeting is even corrected for every individual cable and variations in the electronics that can lead to more or less power consumption. Using the auto-power class can result in a tightly optimized power budget allocation, without introducing complexity in the respective powered device.

The power providing device may be adapted to detect the additional auto-power class in the same way it detects the other classes in the above mentioned PoE IEEE standards, i.e. by measuring the current drawn during the classification stage and comparing the measurement to a lookup table. Preferentially, initially, before granting power, in the maximum power phase the power providing device reserves the maximum amount of power associated with the type of the powered device detected. This to ensure that it can survive the next stage where that powered device can draw power up to the maximum power allowed for that type. After power is granted, the power providing device measures the power or current consumption for a certain predetermined time. It can average the readings or use a peak measurement. After the predetermined power measurement time has lapsed, the power providing device can allocate the proper power budget to the powered device.

For indicating the auto-power class the powered device is preferentially adapted to use the corresponding classification resistor or other means to draw the correct amount of current during classification. After power is granted, the powered device can make sure that it consumes the maximum amount of power for the predefined time period, ensuring that the power providing device will allocate such an amount of power for permanent use. In a luminaire this would mean, for instance, maxing out the light output, disabling any power saving means available and activating all secondary functions such as sensors. This is a simple task for the device's microcontroller, which may be accordingly programmed by using software.

Since the power distribution system described above with reference to FIGS. 1 to 3 provides a solution that allows precise power budgeting, without necessarily requiring Ethernet communication, in an embodiment the power providing device and/or the powered devices do not comprise Ethernet communication functionality. For instance, the power providing device and/or the powered device may not be equipped with a functioning Ethernet link. In particular, the power distribution system described above with reference to FIGS. 1 to 3 may not use LLDP, i.e., for instance, the luminaires 4, 5, 6 may not contain an Ethernet communication stack, while still making use of PoE. Since the power providing device and the powered device do not necessarily need to have Ethernet magnetics, PHY and an Ethernet supporting microcontroller, they can be produced with lower costs.

The auto-power class is especially helpful for lighting applications, where the shortcomings in power budget management are aggravated due to the large amounts of nodes requiring a high amount of power. Also typical for lighting are many different SKU's for different light outputs and color temperatures, making it impossible to define an 'optimal' fixed, i.e. not self-learning, lighting power class.

Although in above described embodiments the powered devices are luminaires, in other embodiment, additionally or alternatively, the powered devices can include other electrical consumers like pure sensors, i.e. not integrated in luminaires, air conditioning equipment, et cetera.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

The control of the power distribution system in accordance with the power distribution method can be implemented as program code means of a computer program and/or as dedicated hardware. A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a power distribution system comprising a power providing device for providing power and a powered device like a luminaire to be powered by the power providing device. The power providing device and the powered device are operable in a maximum power mode and a normal operation mode, wherein in the maximum power mode the powered device consumes an amount of power maximally consumable by the powered device and the power providing device measures the power consumed by the powered device. This measured power allows for an allocation of an amount of power in the operational mode, which is really maximally needed, wherein it is not necessary to allocate a larger amount of power, which is large enough to consider, for instance, a maximally assumed length of an electrical connection connecting the devices, thereby improving the power budget allocation.

The invention claimed is:

1. A power source to be used in a power distribution system, the power distribution system further comprising:
    a power consumer to be powered by the power source and adapted to indicate its power class to the power source, and
    an electrical conductor for transferring the power from the power source to the power consumer;
    the power source adapted to provide power to the power consumer of the power distribution system in at least a maximum power mode and a normal operation mode, wherein the power source is adapted to measure in the maximum power mode the amount of power consumed by the power consumer,
    wherein the power consumer is assigned to one of at least one first power class and at least one second power class, wherein to each power class of the first and second power classes a respective predetermined amount of power is assigned, wherein the predetermined amount of power assigned to the second power class is at least the same as the predetermined amount of power assigned to the first power class,
    wherein the power source is further adapted:
    to, if the power class of the power consumer is the first power class, switch to the maximum power mode, in which the predetermined amount of power assigned to the power class of the power consumer is allocated to the power consumer and the amount of power consumed by the power consumer is measured, and thereafter switch to the normal operation mode, in which the operational amount of power, which depends on the amount of power measured in the maximum power mode, is reserved for the power consumer, in order to allow the power consumer to consume in the normal operation mode an amount of power being equal to or lower than the operational amount of power, and
    to, if the power class of the power consumer is the second power class, switch to the normal operation mode, wherein the predetermined amount of power assigned to the power class of the power consumer is reserved for the power consumer, in order to allow the power consumer to consume in the normal operation mode an amount of power being equal to or lower than the predetermined amount of power assigned to the power class of the power consumer.

2. A power distribution system comprising:
    the power source of claim 1,
    a power consumer to be powered by the power providing device,
    an electrical conductor for transferring the power from the power source to the power consumer,
    wherein the power source and the power consumer are adapted to be operable in at least a maximum power mode and a normal operation mode, wherein the power consumer is adapted to consume an amount of power maximally consumable by the power consumer in the maximum power mode and wherein the power source is adapted to measure in the maximum power mode the amount of power consumed by the power consumer.

3. The power source as defined in claim 1, wherein the power source is adapted to measure the average or peak amount of power consumed by the power consumer over a predetermined time in the maximum power mode and to reserve in the normal operation mode for the power consumer an operational amount of power, which depends on the measured average or peak amount of power, in order to allow the power consumer to consume in the normal operation mode an amount of power being equal to or lower than the operational amount of power.

4. The power source as defined in claim 1, wherein the power source is adapted to switch off the provision of power to the power consumer in the normal operation mode, if the power source detects in the normal operation mode that the power consumer consumes an amount of power being larger than the operational amount of power.

5. The power source as defined in claim 1, wherein the power source is adapted to allocate in the maximum power mode a predetermined amount of power to the power consumer, which is equal to or larger than said predetermined amount of power assigned to the first power class.

6. The power source as defined in claim 1, wherein the power source is adapted to switch off the provision of the power to the power consumer, if the power source detects in the maximum power mode that the power consumer consumes an amount of power being larger than the predetermined amount of power.

7. The power source as defined in claim 1, wherein the power consumer is assigned to a power class and adapted to indicate its power class to the power source, wherein the power source is adapted such that the predetermined amount of power in the maximum power mode depends on the power class of the power consumer.

8. The power source as defined in claim 1, wherein the power consumer is adapted to indicate its power class to the power source by drawing an indication current from the power source, wherein the power source is adapted to detect the power class by measuring the drawn current.

9. The power source as defined in claim 1, wherein the electrical conductor is an Ethernet cable electrically connecting the power source and the power consumer for providing the power from the power source to the power consumer.

10. The power source as defined in claim 1, wherein the power consumer is a luminaire.

11. The power source as defined in claim 10, wherein the luminaire is adapted to be powered by the power source of the power distribution system in at least a maximum power mode and a normal operation mode, wherein the luminaire is adapted to consume an amount of power from the power source, which is maximally consumable by the luminaire, in the maximum power mode;

wherein in the maximum power mode, the luminaire goes to 100 percent dim level, activates all sensors, if any, and disables all power down modes.

12. A power distribution method for distributing power within the power distribution system as defined in claim 2, the power distribution method comprising:

assigning the power consumer to one of at least one first power class and at least one second power class, wherein to each power class of the first and second power classes a respective predetermined amount of power is assigned, wherein the predetermined amount of power assigned to the second power class is at least the same as the predetermined amount of power assigned to the first power class, if the power class of the power consumer is the first power class, switch to a maximum power mode, in which the predetermined amount of power assigned to the power class of the power consumer is allocated to the power consumer and the amount of power consumed by the power consumer is measured, and thereafter switch to a normal operation mode, in which the operational amount of power, which depends on the amount of power measured in the maximum power mode, is reserved for the power consumer, in order to allow the power consumer to consume in the normal operation mode an amount of power being equal to or lower than the operational amount of power, and if the power class of the power consumer is the second power class, switch to the normal operation mode, wherein the predetermined amount of power assigned to the power class of the power consumer is reserved for the power consumer, in order to allow the power consumer to consume in the normal operation mode an amount of power being equal to or lower than the predetermined amount of power assigned to the power class of the power consumer.

13. A non-transitory computer readable storage medium comprising program code configured to cause the power distribution system to perform the power distribution method of claim 12 when the program code is run on a computer controlling the power distribution system.

* * * * *